United States Patent [19]

Ding et al.

[11] Patent Number: 4,823,071

[45] Date of Patent: Apr. 18, 1989

[54] CAPACITIVE MEASURING SYSTEM FOR MEASURING THE DISTANCE BETWEEN TWO RELATIVELY MOVABLE PARTS

[75] Inventors: Kurt Ding, Augsburg; Hartwig Knoell, Karlsfeld; Josef Wenzl, Hebertshausen; Hermann Biebl, Karlsfeld, all of Fed. Rep. of Germany

[73] Assignee: MTU Motoren -Und Turbinen-Union Munchen GmgH, Munich, Fed. Rep. of Germany

[21] Appl. No.: 773,261

[22] Filed: Sep. 6, 1985

[30] Foreign Application Priority Data

Sep. 11, 1984 [DE] Fed. Rep. of Germany ....... 3433351

[51] Int. Cl.$^4$ .................. G01R 27/26; G01R 35/00
[52] U.S. Cl. .................................. 324/61 R; 73/462; 364/571.01
[58] Field of Search .................. 324/61 R, 61 P; 340/870, 37; 364/481, 486, 560, 561, 571; 73/462

[56] References Cited

U.S. PATENT DOCUMENTS

| | | | |
|---|---|---|---|
| 2,842,738 | 7/1958 | Warnick | 324/61 R |
| 4,063,167 | 12/1977 | Duly | 324/61 R |
| 4,251,035 | 2/1981 | Chatwin et al. | 324/61 R X |

Primary Examiner—Reinhard J. Eisenzopf
Assistant Examiner—Jack B. Harvey
Attorney, Agent, or Firm—Roberts, Spiecens & Cohen

[57] ABSTRACT

A capacitive measuring system for measuring the distance between two relatively movable parts based on measurement of capacitative charge comprising a measuring sensor which forms one plate of the capacitor whose gap is to be measured. With the position of the sensor face in the fixed part of casing being known, the plate distance of the gap capacitor provides a direct measure of the gap.

11 Claims, 4 Drawing Sheets

CAPACITIVE MEASURING SYSTEM FOR MEASURING THE DISTANCE BETWEEN TWO RELATIVELY MOVABLE PARTS

FIELD OF THE INVENTION

The invention relates to a capacitive measuring system based on variation in capacitance between two relatively movable elements depending on the spacing therebetween.

More particularly, the invention relates to a capacitive measuring system for measuring the gap between a movable element such as the tip of a rotor blade and the facing stationary casing.

PRIOR ART

When two parts are in relative movement, such as components of machines, more particularly of all types of turbomachines, it is important to know the distance (or gap) between the parts as accurately as possible. For turbomachines, the size of the gap between the rotor blade and the casing affects the leakage losses, which in turn directly affects the efficiency of the machine.

For measuring distances, an electromechanical distance measuring device is described in DE-PS No. 28 07 296, where a stylus is carried in a high-precision screw fitted with a reference stop. The high-precision screw, in turn, is supported in the casing and is variably actuated by means of a geared motor having a coded angular position transmitter. In this arrangement, the travel of the stylus is derived from the measurement of the angle of rotation, and contact of the stylus with the rotor is monitored by highly sensitive electronic circuitry designed to respond just before the sensor makes mechanical contact with the blade.

While affording the advantage of its non-contact measurement of the gap, the stylus method has the disadvantages that it permits measurement of the distance from only the longest blade on a bladed wheel, and measurement is prevented in rapidly changing transient situations.

Another known system of measuring gaps employs a triangulation technique, which comprises optical measurement. This system requires large-size sensors that need cooling at temperatures over 200° C. and give inadequate accuracy of measurement. Another disadvantage is that with high-speed rotors it will measure only the mean length of the blade and not permit measurement on individual blades.

Also known are capacitive measuring systems using frequency modulation techniques. Their disadvantages are much like those of the optical method just described, and its considerable sensitivity to temperature and vibrations make the measuring system especially ill-suited for turbomachines. More particularly, what it measures is the out-of-tune of a resonant circuit whose frequency is controlled not only by the test capacitance but also the sensor and cable capacitance, which varies with fluctuations in temperature and thus directly affects the measurement. This also holds true for vibrations.

Typical examples of capacitive measuring systems can be found in U.S. Pat. Nos. 2,842,738 and 4,063,167.

SUMMARY OF THE INVENTION

In a broad aspect the present invention contemplates a distance measuring system that comprises a relatively small, uncooled sensor, which enables measurements to be made on individual blades, and which exhibits especially high dynamic capability to permit measurements also to be made when a condition is subject to fast change. Additionally, the readings are not substantially affected by external influences such as temperature, vibrations and pressure.

It is a particular object of the present invention to provide a measuring system which comprises a capacitive measuring system based on charge measurement for measuring the distance between two relatively movable parts, said system comprising a sensor coupled to one of the two relatively movable parts and facing the other of the two parts; means for biassing the sensor and said other part to a variable reference voltage ($U_{ref}$) which is stabilized by a voltage suppy unit to form a measuring capacitor; means for measuring charge of said capacitor at two reference potentials; a charge amplifier connected to said sensor, said charge amplifier and voltage supply unit being arranged at a distance from said sensor; a triaxial cable connecting said sensor to said charge amplifier and said voltage supply unit; said charge amplifier having a band width attuned to the frequency of the expected charge signal produced by said capacitor; said sensor having a measuring face which faces said other part and is smaller than the surface area of said other part; and means for determining gap capacitance $C_s$ from measured charge quantity Q of said capacitor from the relation $C_s = Q/U_{ref}$, and determining gap d through $C_s = A + B/d + C \times d$, where A,B,C are calibrated quantities, and d is the value of the gap.

The construction of the invention provides a number of advantages enumerated hereafter.

The capacitive measuring system of the present invention is suitable for stationary as well as transient measurements and, more importantly, also for measurements for individual blades.

The measuring system can be calibrated simply and safely when the machine is at rest, for example, by moving the sensor towards a stationary blade of a bladed rotor and modulating the bias voltage ($U_{ref}$).

The measuring system is made insensitive to vibration by virtue of active direct voltage shielding means employed in the sensor and cable. Considering that the charge flowing in and from the gap capacitance is measured, changes in cable or sensor capacitance caused by temperature variations will not affect the reading.

The system enables measurements to be made for individual blade lengths at blade alternation frequencies as high as about 50 kHz.

Measurements can be made of the gap-versus-time profile for transient changes (accelerations, decelerations).

The sensor of the measuring system can be made rather small, and fitted with a flexible lead, and it can be inserted in small casing ports. Without cooling it will be operative at temperatures up to 600° C.

The measuring system is provided with fast measuring electronic means to determine the amplitude of the signal of the successive blade pulses and permit fast conversion of the measured signal amplitude into a gap value and into digital and/or analog gap output values.

BRIEF DESCRIPTION OF THE FIGURES OF THE DRAWING

The accompanying drawing shows strictly shcematic arrangements of embodiments of the present invention.

DETAILED DESCRIPTION

Figure 1A:
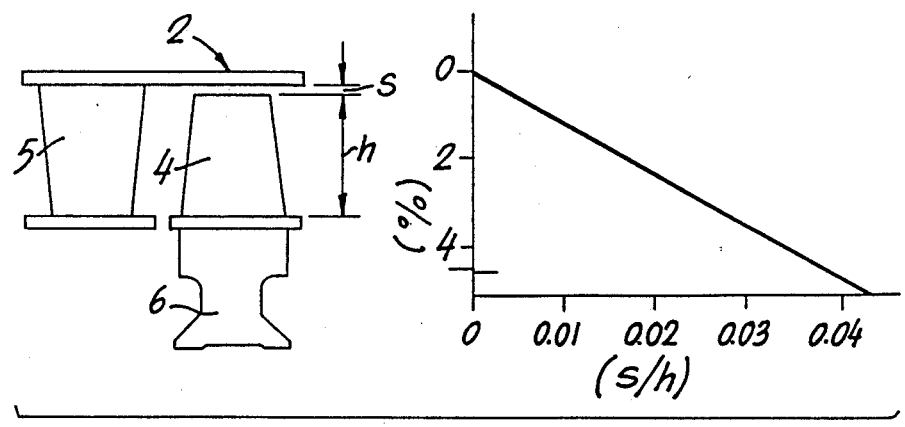
FIG. 1a diagrammatically illustrates an axial-flow turbine and corresponding graphical illustration of efficiency versus rotor gap.

With reference to FIG. 1a, therein is seen a turbine rotor having rotor blades 4 of a length h forming a gap s relative to a casing 2 having a stator or stationary ring of vanes 5. The graph next to the rotor shows percent loss in efficiency versus relative radial rotor gap. The two parameters are seen to vary linearly.

Figure 1B:
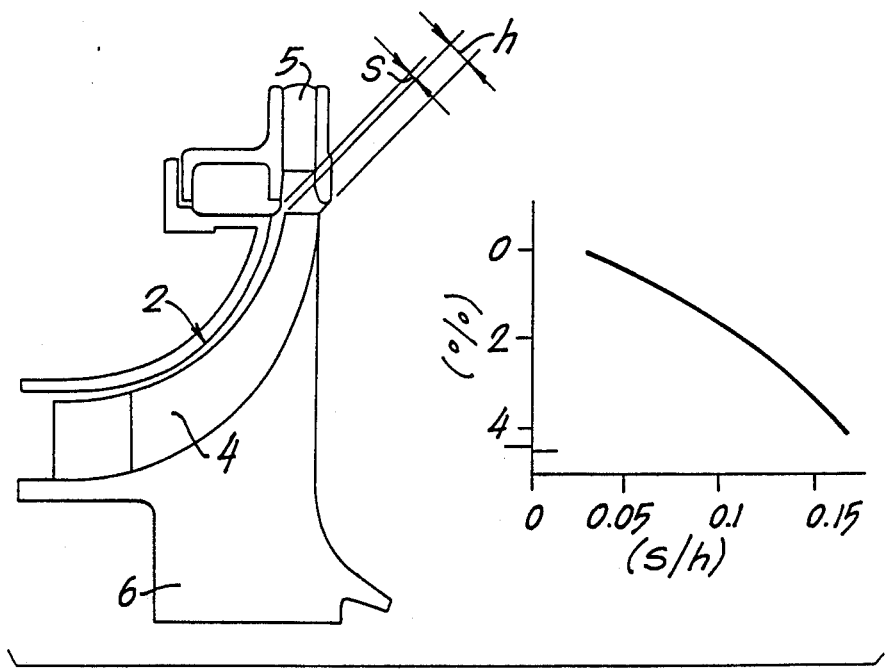
FIG. 1b diagrammatically illustrates a radial-flow compressor and corresponding graphical illustration of efficiency versus rotor gap.

FIG. 1b shows a radial-flow compressor with its rotor 6 and an outer casing 2 with its stator or ring of stator vanes 5. As in FIG. 1a the effective length of the rotor blade is again designated by reference character h and the gap between the rotor and the casing is designated by reference character s. The accompanying graph shows the percent loss in efficiency versus relative axial rotor gap. This graph applies not only to compressors, but also to pumps, blowers, ventilators, turbochargers and similar machines. As distinguished from FIG. 1a, the relation between the parameters in FIG. 1b is curved rather than linear.

Figure 2:
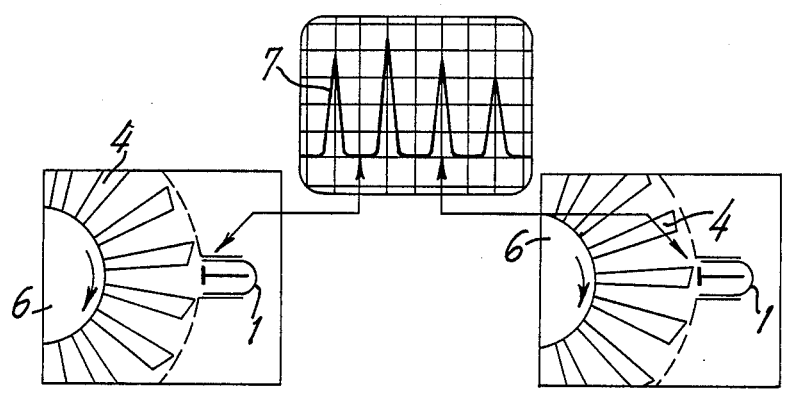
FIG. 2 diagrammatically illustrates test signals generated at respective positions of a bladed rotor relative to a sensor of the measuring system arranged in accordance with the present invention.

FIG. 2 diagrammatically illustrates the position of a sensor 1 relative to the tip of the blade of the rotor 6, and the test signals generated by use of the sensor 1. In the left-hand portion of FIG. 2, the sensor 1 faces the space between two adjacent blades, and in the right-hand portion of FIG. 2 the sensor faces the tip of a horizontally extending blade. The direction of rotation of rotor 6 is indicated by the arrows. An output signal 7 from a charge amplifier and its correspondence with a particular blade/sensor position is shown by lines with arrowheads at its ends. In the center of each space between the blades the output signal is a minimum, while it is a maximum (peak voltage) when the distance, i.e. gap between the blade tip and the sensor is a minimum.

Figure 3:
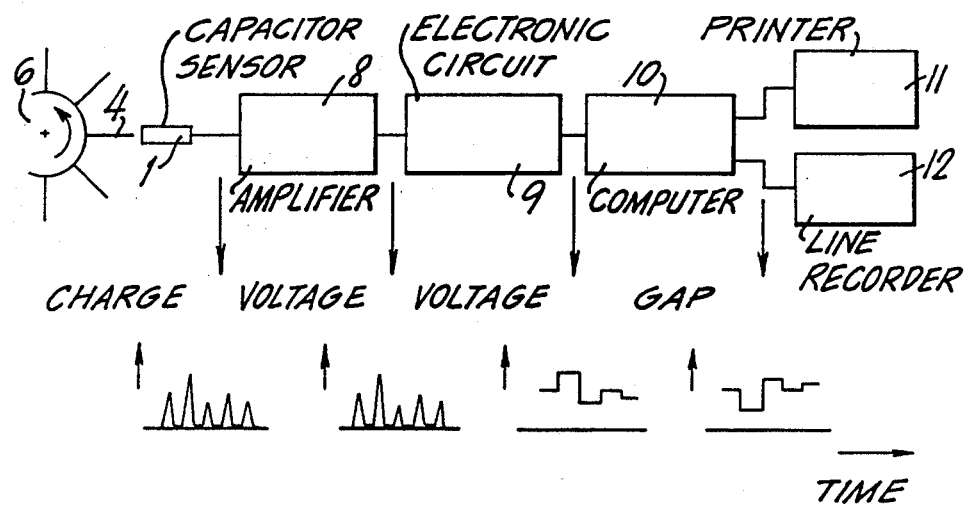
FIG. 3 is a block diagram of the measuring system of the invention.

In FIG. 3 is shown a system which comprises, when viewed from left to right, rotor 6 and a capacitor which forms sensor 1 mounted in the casing. The sensor 1 faces the blade tip 4 and capacitance-to-charge conversion takes place in the sensor. A charge-to-voltage conversion and generation of a sensor voltage occurs charge amplifier/sensor voltage unit in a 8 connected to sensor 1. Signal conditioning, peak value measurement and digitalization take place in an electronic conditioning circuit 9 connected to unit 8. System control and gap computation are effected in a computer 10, and the output is fed to a printer 11 or continuous-line recorder 12. Use can optionally be made also of other data output and/or plotting or recording means.

Figure 4:
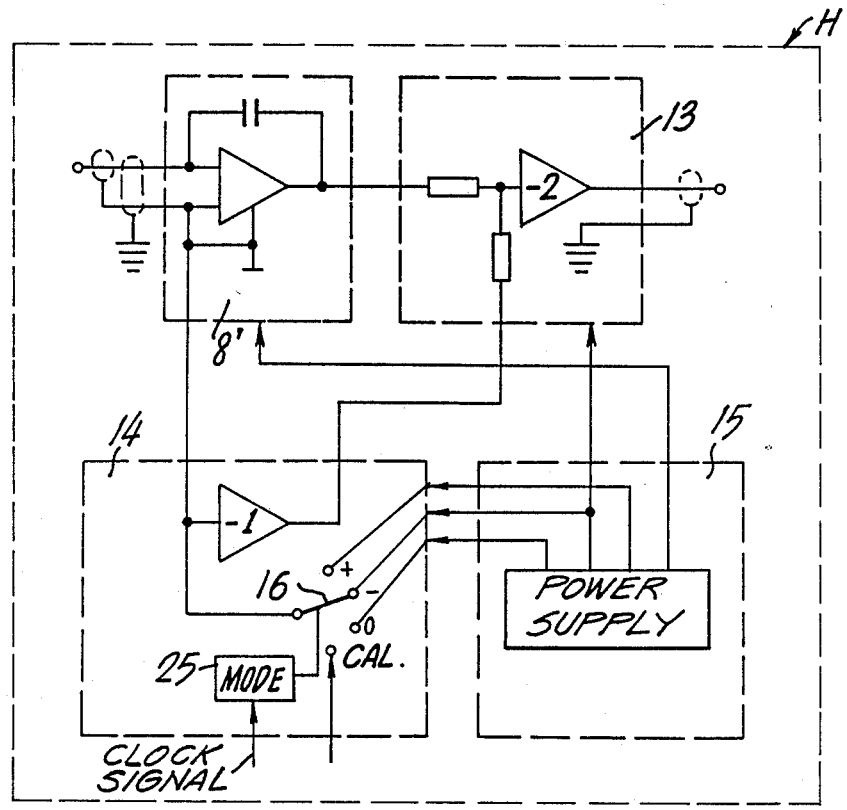
FIG. 4 schematically illustrates one of the components in the measuring system.

FIG. 4 shows a block diagram of the charge amplifier/sensor voltage unit 8 consisting of a charge amplifier 8', a differential amplifier 13, a sensor voltage source 14 and a power supply 15, which unit serves for charge-to-voltage conversion and sensor voltage generation.

The charge amplifier 8' and the differential amplifier 13 are connected in series. The output of the charge amplifier 8', which is referenced to ground by the differential amplifier 13, is supplied to the electronic conditioning circuit 9. The charge amplifier 8' is also connected to the sensor voltage source 14.

Figure 5:
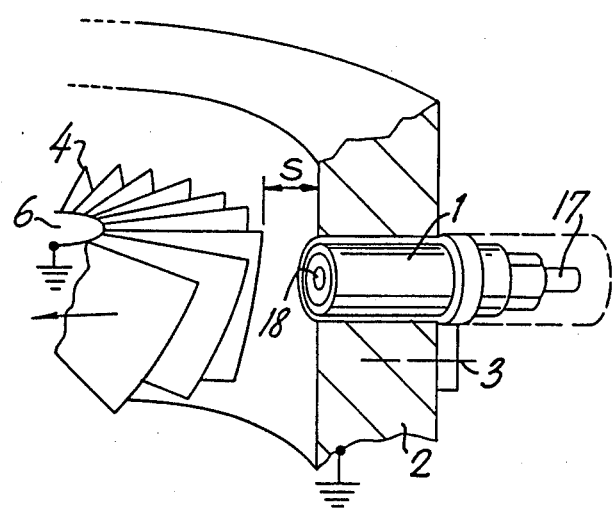
FIG. 5 is a perspective view, partly broken away, illustrating a sensor installed in the casing and an associated rotor.
Figure 6:
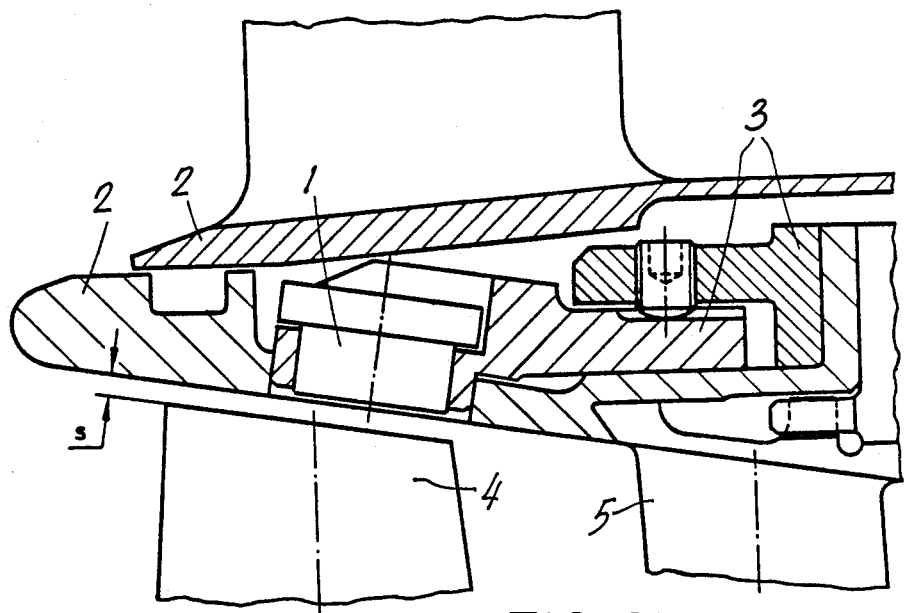
FIG. 6 is a sectional view through a turbomachine casing with an installed sensor.

FIGS. 5 and 6 depict spatial sensor arrangements in the casing of a turbomachine. Correspondence with the rotor is shown in perspective view in FIG. 5. The active sensor face and a triaxial arrangement of the electrodes and insulation layers are shown in FIG. 5. The sensor is fitted in the casing of the machine to permit calibration in situ, and at a safe distance from the longest blade. The gap between the rotor and specifically the blade tips thereof and the casing is indicated at s.

In FIG. 6 the sensor is installed in a multi-piece stator. The sensor is designated by numeral 1 and its carrier by numeral 3, while the casing is indicated by numeral 2. The distance from the sensor to the tip of the blade 4 of rotor 6 is seen at d. As seen, the sensor 1 is small and easy to install. The sensor diameter shown in FIG. 6 is about 10 mm and its height is even less. A lead wire can be directly connected to the sensor on the side facing away from the blade tip. The amplifier unit comprised of amplifiers 8' and 13 (shown in FIG. 4) is preferably accommodated in a special rugged housing H, together with the sensor voltage source 14 and the power supply.

If the gap capacitor is biased from sensor voltage source 14 at a constant direct voltage $U_{ref}$ relative to the rotor, the active sensor face is electrically charged and discharged at every passage of the blade.

If the active sensor face 18 of the measuring system is connected to the charge amplifier, a voltage signal $U_A$ is generated at its output end which is a measure of the charge quantity Q at its input end.

The maximum charge quantity $Q_{imax}$ of each blade alternation varies with the capacitance of the gap capacitor $C_{si}$ and thus with the distance $d_i$ of the individual blade 4 from the sensor in accordance with the equation: $Q_{imax} = C_{si} \times U_{ref} = U_{ref} \times f(d_i)$ ; where $f(d_i)$ indicates the relationship between gap and capacitance as determined by calibraton and exemplified by the expression $C_{si} = A + B/d_i + C \times d_i$ where A, B and C are calibrated quantities and d is the value of the gap.

The above formula consists of two terms: B/d is the basic expression for a plate capacitance, $A + C \times d$ is an expression necessary for the small size of the electrodes of the capacitor. It was verified experimentally that the second term covers sensors and blades with a wide variety in size and shape. In the calibration, A, B, C are experimentally determined for each pair of cooperating sensor and rotating counterparts. The formula is only valid for normal gaps for rotary and stationary parts in a machine. In other applications instead of this formula with calibrated parameters A, B, C, calibration curves or functions can be used.

In this formula index i, refers to the number of the respective blade or of its gap.

Since the charge amplifier 8 is connected to the sensor 1 by triaxial cable 17 in an insulated arrangement, where the core and shield are at the same potential, variations in the self-capacitance of the sensor or cable in the area between the shield and the core of sensor 1 are not sensed by the charge amplifier 8', there being no charge shifting by recharging, for the reason that this area of the capacitor is at the same potential on both sides, whereby only the capacitance of the gap capacitor is sensed and this varies with the distance between the sensor 1 and the blade 4. The sensor 1 is arranged as close as possible to the moving part 4. The distance between the sensor 1 and the longest blade 4, however, is selected to suit conditions. If it is kept rather small, the sensitivity of the measuring device is increased. The measuring area or face 18 of the sensor 1 can be adapted to suit the inner contour of the casing 2 if it should be other than planar.

The sensor 1 installed in the casing 2 forms, together with the blade tip 4, a gap capacitor whose plate distance is measured. With the position of the active sensor face 18 in the casing being known, the plate distance will directly yield the rotor gap d.

The charge at the gap capacitor is converted by the charge amplifier 8' having a large width of frequency band, into the voltage signal 7 indicated in FIG. 2. The band width of the charge amplifier 8' is advantageously attuned to suit the frequency of the charge signal anticipated. In order not to reduce the upper cutoff frequency of the charge amplifier, the sensor lead 17 is kept short.

The electronic conditioning circuitry 9 serves to measure and digitalize the peak value of each blade alternating pulse after the signal has been filtered and amplified. The pulse amplitude values so determined are then input, in the form of bits, to the computer 10 by parallel transmission.

The computer 10 controls the measuring cycle in accordance with the operating mode selected by the user and converts the readings in volts into gap values d in mm.

Figure 8:
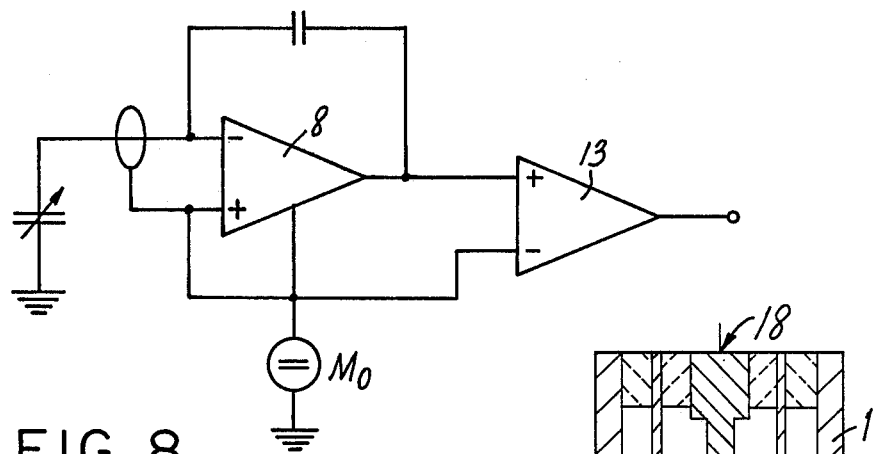
FIG. 8 is a schematic illustration of the charge amplifier, with its connections, of the measuring system.

The operating modes available for selection at selector 16 under control of mode unit 25 (FIG. 4) are:
 (a) stationary measurement
 (b) transient measurement
 (c) single blade measurement
 (d) calibration Distinction must be made between stationary and transient measuring operations. If the measurement is made twice at different polarities of the sensor bias voltage, and if the arithmetic mean is then taken, a gap signal varying with the sensor bias voltage is obtained even when the rotor is poorly grounded. Pole reversal of the sensor bias voltage should be made at a clock frequency adapted to suit the respective application. Sensor voltage source 14 supplies the bias voltage to the sensor as shown in FIGS. 1, 4, and 8 and polarity reversal is effected by selector 16 at a clock frequency under the control of the mode unit 25 as shown in FIG. 4. The clock frequency can be readily determined experimentally and differently for stationary and transient measurements. In the stationary operating mode, the sensor bias voltage polarity can be reversed automatically after a predetermined period of time has elapsed. In the transient operating mode, the polarity reversal can be interrupted, e.g. during rapid acceleration or deceleration phases of the machine. A correction factor is then selected at a single reversal process. The computer automatically processes this correction factor at gap signal value picked up at one polarity, as in this example.

The computer can indicate, regardless of the operating mode, the smallest gap in a revolution, the largest gap, or the mean gap. Also possible is a single blade measurement, where the gap values are determined and recorded for each blade on the circumference thereof. The readings are output differently for stationary and transient measurements, respectively.

Calibration prior to measuring is achieved as follows;

The sensor 1 is moved relative to the casing 2 in the direction of the moving part, i.e. the rotor 6 with the blade. Periodic modulation of the reference voltage (sensor bias voltage) changes the charge of the capacitor, which consists of the sensor and the blade, to generate a calibration signal.

Figure 7:
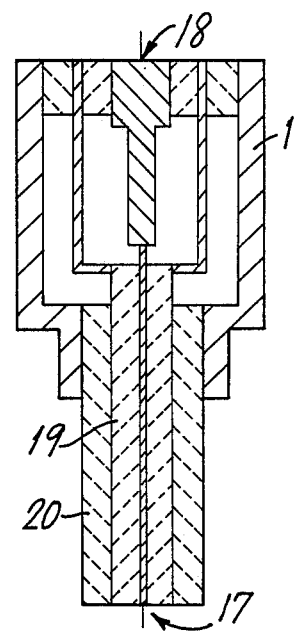
FIG. 7 is a sectional view of the sensor.

The construction of the capacitive measuring sensor will become apparent from the embodiment shown in FIG. 7.

The measuring face 18 is concentrically insulated by layers 19, 20 between conductors of a predetermined thickness (disruptive breakdown safety) and is connected to the charge amplifier 8' (FIG. 8) through the triaxial cable 17, where the inner conductor is connected to one pole of the amplifier 8' and the outer conductor to its other pole by frame-ground connector. The layers 19, 20 may be glass, ceramic, metal, plastic or combinations thereof that constitute a dielectric and can be formed into a mechanically rigid and thermally resistant composite.

Variations in the embodiments illustrated and described above can be made within the scope of the present invention. Applications other than those described above are also practicable. The measuring system can be fully automated as regards operational control, evaluation and error control, and it can be operated on several channels. The inventive concept is not limited to turbomachines, but is generally applicable to prime movers and machinery and can be used as a distance-measuring sensor on machine tools or in manipulating systems, such as robots.

What is claimed is:

1. A capacitive measuring system based on charge measurement for measuring the distance between two relatively movable parts, said system comprising:
 a sensor coupled to one of the two relatively movable parts and facing the other of the two parts;
 means for biassing the sensor and said other part to a variable bias voltage ($U_{ref}$) which is stabilized by a voltage supply unit to form a measuring capacitor in which one of the plates of the capacitor is constituted by said sensor and the other of the plates of the capacitor is constituted by said other part;
 means for measuring charge of said capacitor at two reference potentials;
 a charge amplifier connected to said sensor, said charge amplifier and voltage supply unit being arranged at a distance from said sensor;
 a triaxial cable connecting said sensor to said charge amplifier and said voltage supply unit;
 said charge amplifier having a bad width attuned to the frequency of the expected charge signal produced by said capacitor;
 said sensor having a measuring face which faces said other part with a gap d therebetween;
 and means for determining gap capacitance $C_s$ from measured charge quantity Q of said capacitor at said two reference potentials from the relation $C = Q/U_{ref}$.

2. A measuring system as claimed in claim 1 wherein said one part is a stationary casing and said other part is a rotor having spaced blades thereon.

3. A measuring system as claimed in claim 2 wherein said measuring face of said sensor is smaller in extent than the spacing between two adjacent blades at the periphery of the blades.

4. A measuring system as claimed in claim 2 wherein said sensor is fixedly securable in said casing and permits of displacement calibration in situ.

5. A measuring system as claimed in claim 1 wherein the polarity of the voltage output from the charge amplifier to the capacitor is reversible.

6. A measuring system as claimed in claim 5 comprising means for automatically effecting the reversal.

7. A measuring system as claimed in claim 1 wherein said system includes multiple channels for recording and evaluating capacitance values of said sensor and a computer for receiving said capacitance values.

8. A measuring system as claimed in claim 1 wherein said voltage supply unit includes means for controlling the bias voltage ($U_{ref}$).

9. A measuring system as claimed in claim 8 wherein said charge amplifier and said means for controlling the bias voltage are formed into a common constructional unit.

10. A measuring system as claimed in claim 1 wherein said triaxial cable includes an inner conductor connected to one pole of the amplifier, an outer conductor connected to the other pole of the amplifier and an insulator layer between said inner and outer conductors.

11. A measuring system as claimed in claim 1 wherein said means for measuring charge of the capacitor measures the charge at the two reference potentials at different polarities of the sensor bias voltage.

* * * * *